US006192618B1

(12) United States Patent
Wackerman

(10) Patent No.: US 6,192,618 B1
(45) Date of Patent: Feb. 27, 2001

(54) HIGH ACTION FISHING LURE

(75) Inventor: Jack Wackerman, Hermitage, MO (US)

(73) Assignee: Kalin Farms, Brawley, CA (US)

( * ) Notice: Subject to any disclaimer, the term of this patent is extended or adjusted under 35 U.S.C. 154(b) by 0 days.

(21) Appl. No.: 08/690,994

(22) Filed: Aug. 1, 1996

(51) Int. Cl.$^7$ .................................................. A01K 85/00
(52) U.S. Cl. ........................................ 43/42.31; 43/42.15
(58) Field of Search ............................. 43/42.15, 42.28, 43/42.31

(56) References Cited

U.S. PATENT DOCUMENTS

| 1,402,798 | | 1/1922 | Ryan . | |
|---|---|---|---|---|
| 1,545,683 | | 7/1925 | Nowak . | |
| 1,557,644 | | 10/1925 | Andersen . | |
| 1,607,107 | | 1/1926 | Weller . | |
| 1,692,935 | | 11/1928 | Heddon . | |
| 1,707,407 | | 4/1929 | Miles . | |
| 1,791,316 | | 2/1931 | Jordan . | |
| 1,828,574 | | 10/1931 | Neukam . | |
| 2,069,972 | | 2/1937 | Schroeder . | |
| 2,334,792 | | 11/1943 | Royston . | |
| 2,441,302 | | 5/1948 | Watkin . | |
| 2,503,529 | * | 4/1950 | Wardrip | 43/42.15 |
| 2,542,429 | * | 2/1951 | Perry | 43/42.48 |
| 2,597,792 | | 5/1952 | Hardy . | |
| 2,674,060 | * | 4/1954 | Simmons | 43/42.15 |
| 2,691,235 | | 10/1954 | Pcola . | |
| 3,003,276 | * | 10/1961 | Patterson | 43/42.15 |
| 3,172,227 | * | 3/1965 | Mackey | 43/42.31 |
| 3,423,868 | | 1/1969 | LeMaster . | |
| 3,426,467 | | 2/1969 | Bryant . | |
| 3,535,814 | * | 10/1970 | O'Brien | 43/42.15 |
| 3,550,304 | * | 12/1970 | Kuslich | 43/42.15 |
| 3,727,339 | | 4/1973 | LeMaster . | |
| 3,831,307 | * | 8/1974 | Pittman | 43/42.31 |
| 3,979,853 | * | 9/1976 | Storm | 43/42.31 |
| 4,044,492 | | 8/1977 | Ingram . | |
| 4,477,994 | | 10/1984 | Erickson . | |
| 4,654,995 | | 4/1987 | Rapelje . | |
| 4,674,224 | | 6/1987 | Williams . | |
| 4,744,169 | * | 5/1988 | Nochta | 43/42.31 |
| 5,018,297 | * | 5/1991 | Kennedy | 43/42.31 |
| 5,070,639 | * | 12/1991 | Pippert | 43/42.31 |
| 5,119,581 | | 6/1992 | Rudolph . | |
| 5,522,170 | | 6/1996 | Cole . | |

OTHER PUBLICATIONS

Bass Pro Shops 1995 catalog, Pro–Tail Grub, page unknown, Jan. 1995.*
Fred Arbogast A.C. Plug replacment tails, Apr. 1994.*
"Kalin's Tournament Tested Best" 1996 brochure, copyright 1995, pp. 1, 10, 12, and 14.
the In–Fisherman, May/Jun. 1995, article entitled "It's a Trout, It's a Submarine!", pp. 82–88.

* cited by examiner

Primary Examiner—Kurt Rowan
(74) Attorney, Agent, or Firm—Nixon & Vanderhye P.C.

(57) ABSTRACT

A fishing lure that has high action includes a removable flexible material tail section with a removable rattle, the tail section having a rear end with a three-dimensional bulge (such as a spherical segment or truncated cone) having a socket that contains the rattle. The head section of the lure is connected by a multi-dimensional pivot connection to a middle section of the lure, to which the flexible tail section is readily removably attached by two or more removable spaced metal pins. The head section includes a scoop in the front end and top, for causing erratic action of the head section as the lure is pulled through the water, typically by a fishing line connected to a fishing line attachment device within the scoop. At least one hook-receiving connection is fixed to at least one of the head and middle sections, typically extending downwardly from each of the head and middle sections.

18 Claims, 5 Drawing Sheets

HIGH ACTION FISHING LURE

BACKGROUND AND SUMMARY OF THE INVENTION

Fishermen are constantly in search of artificial fishing lures which will attract desired species of fish. In pursuit of highly desirable lures, a wide variety of different constructions of lures with body sections that are articulated with respect to each other, and sometimes with flexible material portions which "quiver" and trigger strikes, have been provided, such as shown in U.S. Pat. Nos. 1,545,683, 1,607,107, 1,692,935, 4,654,955, and 5,522,170. According to the invention a fishing lure is provided that has the advantages of the above mentioned lures as far as articulated body sections, including a flexible portion, are concerned, but also has other advantages.

The fishing lure according to the present invention has a readily replaceable flexible tail section, and the rear end of the tail section has a bulge with a socket for receiving a rattle. A noise making action of a rattle has been demonstrated (such as by the SWIM BAIT® and TUBE KRAW® lures sold by Kalin Farms of Brawley, California) to be very effective in attracting desired fish species. Also, the lure according to the invention has a particularly configured scoop in the front and top portions of the head section which causes erratic action of the head section as the lure is pulled through the water, thereby simulating the movement of a small fish or other aquatic animal that is particularly attractive to game fish.

According to one aspect of the present invention a fishing lure is provided comprising the following components: A substantially rigid head section having a bait simulating appearance, a front end and a rear end. A substantially rigid middle section having a front end and a rear end. A multi-dimensional pivot connection between the head section rear end and the middle section front end. A flexible material tail section having a front end and a rear end, the front end of the tail section fixed to the rear end of the middle section. At least one hook receiving connection fixed to at least one of the head and middle sections. At least one attachment for connecting at least one of the head and middle sections to a fishing line. A three-dimensional bulge formed at the rear end of the tail section. And, a rattle mounted by the bulge, the rattle making noise when the tail section is moved through water.

The head and the middle sections each have a top and a bottom, and the at least one hook receiving connection preferably includes a connection at the bottom of one of (or both of) the head and middle sections. The lure also comprises a substantially continuous scoop formed in the head section at the front end thereof and in the top of the head section, for causing erratic action of the head section as the lure is pulled through the water. Where the head section simulates a fish, including eyes spaced from the front end, the scoop extends from the front end of the head section past the eyes. The eyes preferably include recesses formed in the head section, and the scoop extends about 50% or more of the length of the head section and includes two different angled portions. For example the scoop has a proportional length of between about 2¼–2½ inches, and a proportional maximum depth of between about ³⁄₁₆–⁵⁄₁₆ inch (e.g. about ¼ inch), when the head section is between about 4 and 4½ inches long. The fishing line attachment preferably comprises an attachment mounted to the head section front end, within the scoop.

The tail section preferably comprises an integral injection molded piece of soft plastic, of the same type used for "SWIM BAIT®" lures sold by Kalin Farms, and has a socket receiving the rattle. The rattle may comprise, as is conventional per se with Kalin SWIM BAIT® lures, a substantially spherically shaped hollow hard element (e.g. clear plastic) with at least one hard rattling element within it (e.g. a metal sphere). The rattle is removable from the socket without destroying the socket or rattle, and replaceable in the socket.

The tail section is preferably removable, connected to the middle section by two (or more) removable metal pins extending from opposite sides of the middle section into an open channel in the rear of the middle section, and spaced along the length of the channel. To replace the tail, one merely tears out the existing tail (the pins are harder than the tail soft plastic so that the tail rips) and using a needle-nosed pliers one reaches into the tail channel and slides the metal pins outwardly to clear the channel. Replacement can be made with a tail section specifically for that purpose, or by using a conventional SWIM BAIT® lure rattler tail, and cutting off the head square to obtain the desired overall fit and length. Then the new tail is slipped into the channel in the middle section and the metal pins are pushed back into place.

That is, according to another aspect of the present invention there is provided a method of using a fishing lure having head and middle substantially rigid sections connected together by a multi-dimensional pivot at a front end of the middle section, a channel in a rear end of the middle section, and a flexible tail section held in the channel by at least two hard material readily removable pins extending into the channel from opposite sides, and spaced from each other along the length of the channel. The method comprises the steps of: (a) ripping the flexible tail section out of the channel by pulling on the flexible tail section so that it is torn by the hard pins; (b) using a needle nose pliers or the like, engaging the readily removable pins and sliding them out of the channel; (c) placing a new flexible material tail section into the channel; and (d) pushing the pins back into the channel so that they penetrate the flexible material tail section and hold the tail section in place in the channel. The method also preferably comprises the further step of making the new flexible material tail section used in the practice of steps (c) and (d) by taking a pre-existing soft flexible material lure having a head and tail, and cutting off the head of the pre-existing soft flexible material lure and squaring the pre-existing lure off so that it fits properly in the channel.

According to another aspect of the present invention a fishing lure is provided comprising the following components: A substantially head section having a bait simulating appearance, a front end and a rear end. A substantially rigid middle section having a front end and a rear end. A multi-dimensional pivot connection between the head section rear end and the middle section front end. A flexible material tail section having a front end and a rear end, the front end of the tail section fixed to the rear end of the middle section. At least one hook receiving connection fixed to at least one of the head and middle sections. At least one attachment for connecting at least one of the head and middle sections to a fishing line. The head and middle sections each have a top and a bottom; and the at least one hook-receiving connection includes a connection at the bottom of at least one of the head and middle sections. And, a substantially continuous scoop formed in the head section at the front end thereof and in the top of the head section, for causing erratic action of the head section as the lure is pulled through the water. The details of the lure according to this aspect of the invention are preferably as described in the preceding paragraphs.

It is the-primary object of the present invention to provide a highly effective and readily utilizable fishing lure. This and other objects of the invention will become clear from an inspection of the detailed description of the invention and from the appended claims.

DETAILED DESCRIPTION OF THE DRAWINGS

Figure 1:
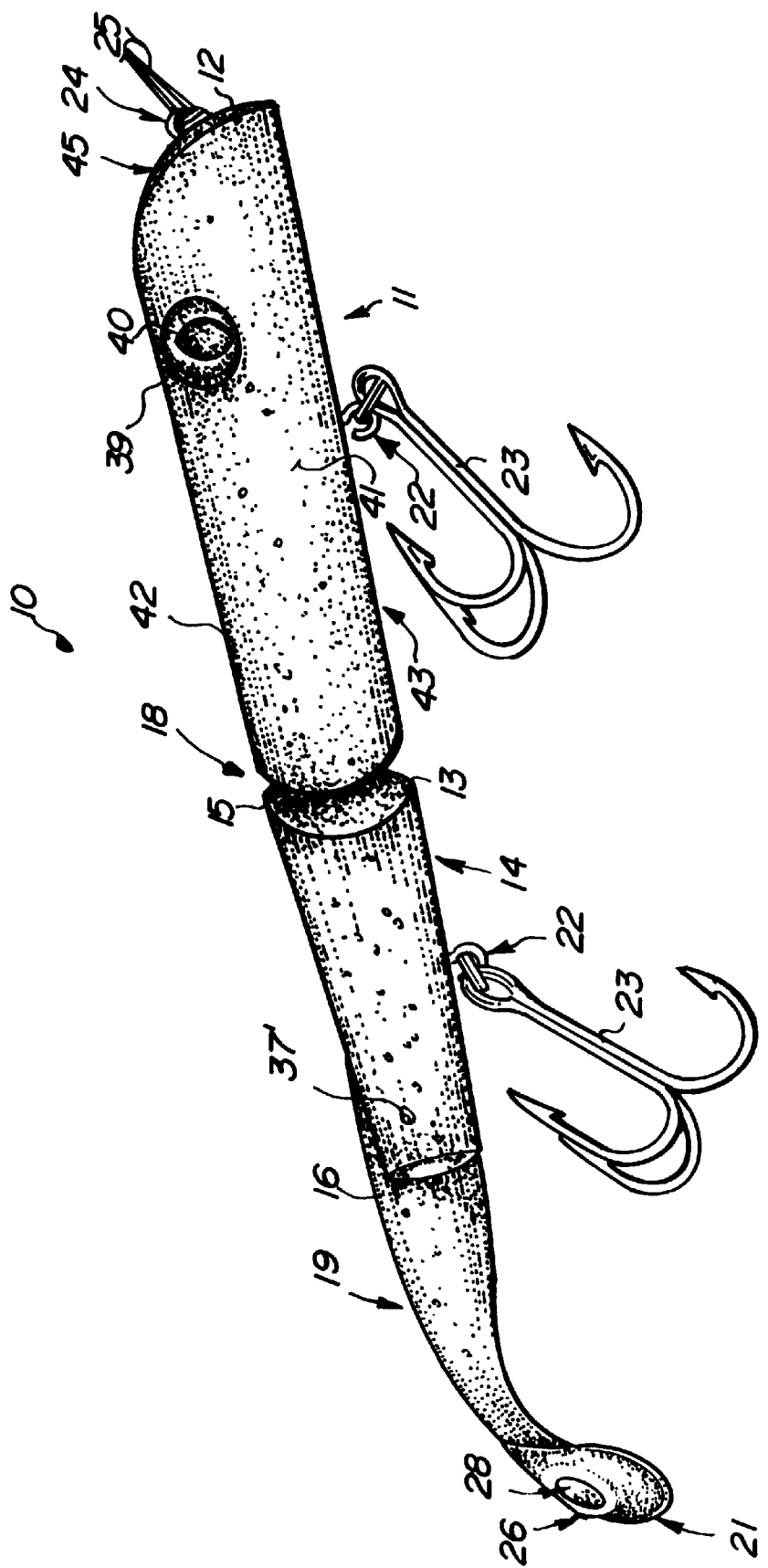
FIG. 1 is a top perspective view, with the rear end of the tail section turned back toward the viewer, of one embodiment of an exemplary fishing lure according to the present invention.
Figure 2:
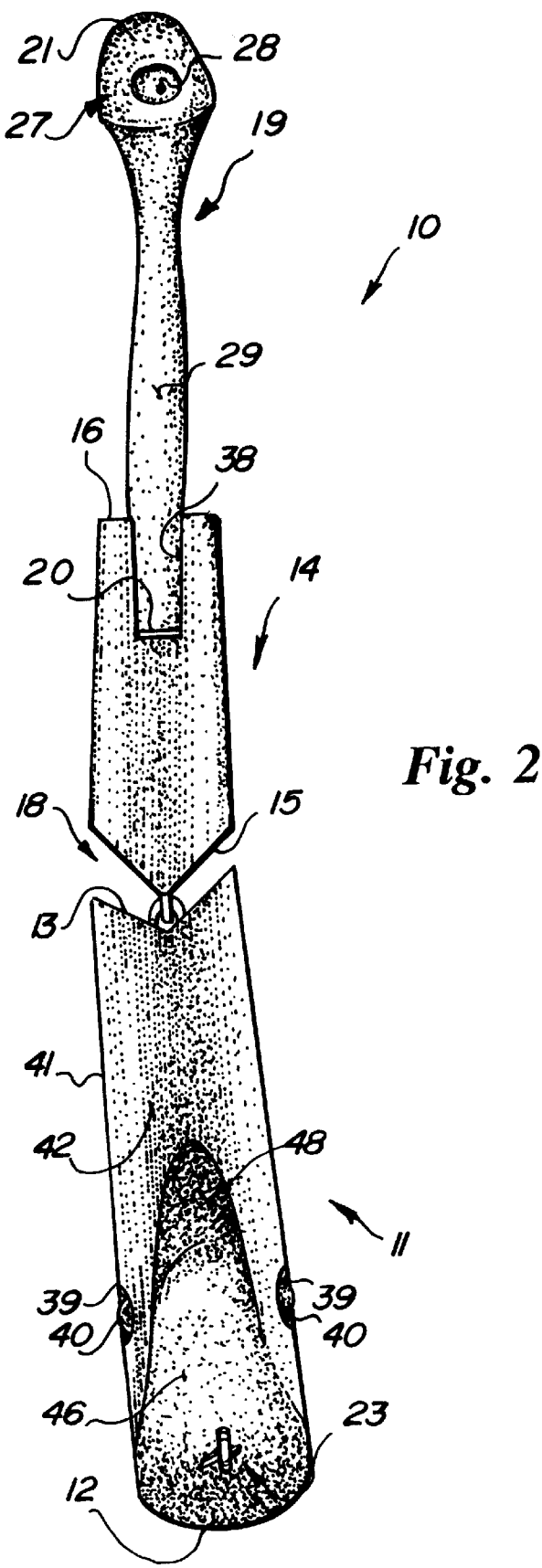
FIG. 2 is a top plan view of the lure of FIG. 1, only with a modified rear end of the tail section.
Figure 3:
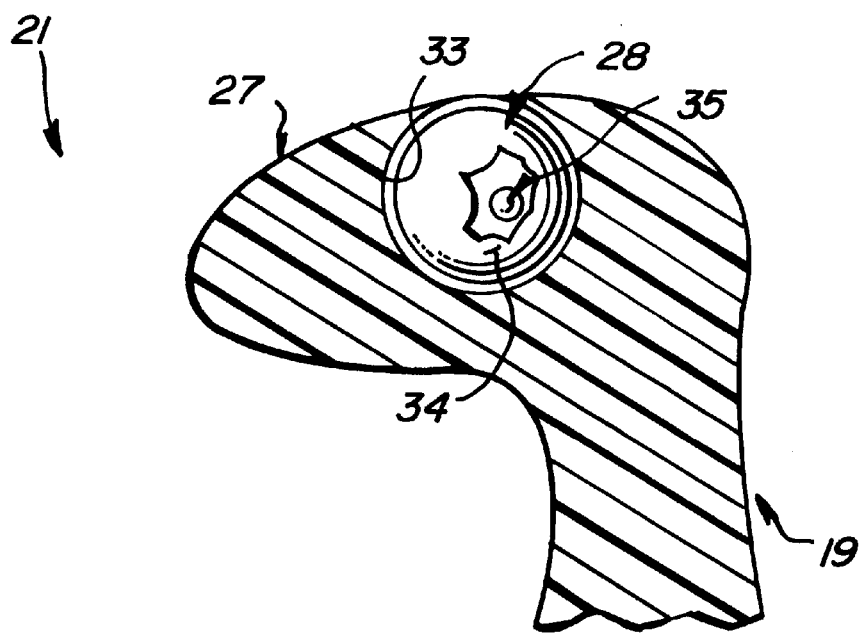
FIGS. 3 and 4 are detail side cross-sectional views of the rear end of the tail section of the lure of FIG. 2, FIG. 3 showing a rattle in place, and FIG. 4 showing the rattle removed.
Figure 4:
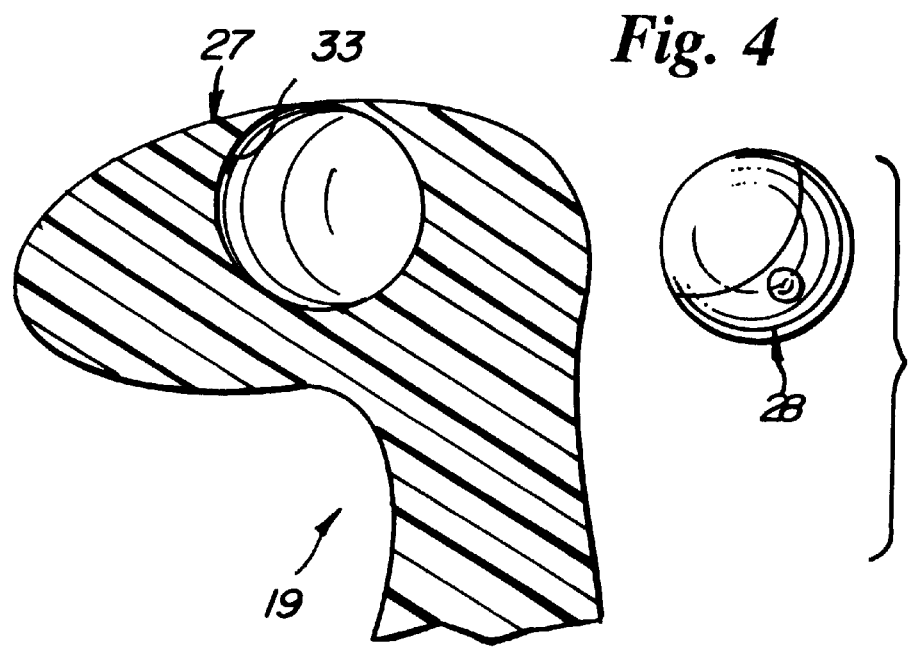
Figure 5:
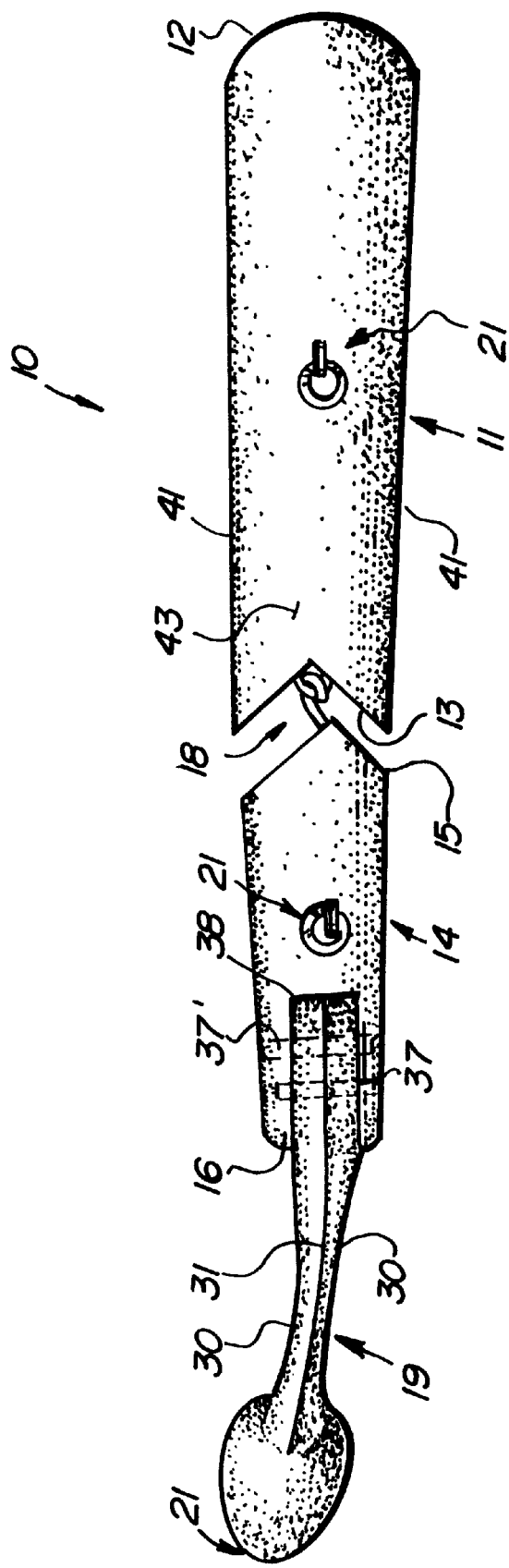
FIG. 5 is a bottom plan view of the lure of FIG. 2.

An exemplary lure according to the present invention is shown generally by reference numeral 10 in FIGS. 1, 2, and 5. The major components of the lure 10 include: A substantially rigid (e.g. wood, such as cedar, hard plastic, metal shell, or the like) head section 11 having a bait simulating appearance (e.g. like that of a small fish, crawdad, or other aquatic creature), a front end 12 and a rear end 13. A substantially rigid middle section 14 having a front end 15 and a rear end 16. A multi-dimensional pivot connection 18 between the head section rear end 13 and the middle section front end 15. A flexible material tail section 19 having a front end 20 and a rear end 21, the front 20 affixed to the rear end 16 of the middle section 14. At least one hook-receiving connection 22 (receiving a conventional hook 23) fixed to at least one of the head and middle sections 11, 14 (and preferably one connection 22 attached to each section 11, 14 as illustrated in FIG. 1). At least one attachment 24 for connecting at least one of the head and middle sections 11, 14 to a conventional fishing line 25. A three-dimensional bulge—shown generally by reference numeral 26 in the FIG. 1 embodiment, and generally by reference numeral 27 in the FIGS. 2 through 4 embodiment—formed at the rear end 21 of the tail section 19. And a rattle 28 mounted by the bulge 26, 27, the rattle 28 making noise when the tail section 19 is moved through the water. The flexible tail section 19, with rattle 28, provides both quiver and clatter that generate strikes, such as in conventional Kalin SWIM BAIT® lures.

The details of a number of the components as described above are not significant as long as they perform the desired function. For example the multi-dimensional pivot connection 18 may comprise substantially perpendicular metal eyelets screwed into the ends 13, 15 of the sections 11, 14, respectively, or may comprise any of the pivot connections such as shown in U.S. Pat. Nos. 1,545,683, 1,607,107, 1,692,935, 4,654,995, 1,402,798, 1,557,644, 1,707,407, 1,791,316, 1,828,574, 2,069,972, or 2,334,792, or other conventional multi-dimensional pivots.

The hook-receiving connection or connections 22 may also have any conventional construction that will suitably position and hold a hook (the hook 23 not necessarily having three strike elements, but also possibly having one, two, or more than three, elements). While in the drawings the connection 22 is shown as an eyelet screwed into a section 11, 14 with a ring connection between the eyelet and the hook 23, other suitable forms the connection 22 may take are shown, is without limitation, in U.S. Pat. Nos. 1,557,644, 1,707,407, 1,791,316, 2,069,972, 3,727,339, 4,674,224, or 5,199,581.

The fishing line 25 connection 24 also may comprise any suitable conventional construction. In the embodiment illustrated in the drawings it comprises a screwed in eyelet with a ring between the eyelet and the line 25, but it may have connections such as shown, without limitation, in U.S. Pat. Nos. 1,402,798, 1,557,644, 1,707,407, 2,069,972, 2,597, 792, 2,691,235, 3,423,868, or 4,477,994.

While the tail section 19 is preferably made of soft flexible plastic, such as that commonly used in soft plastic fishing lures (such as the Kalin SWIM BAIT® lures), and is preferably formed by injection molding, under some circumstances it may comprise another flexible material such as organic materials like leather or pork rind. In the preferred embodiment illustrated in FIGS. 1, 2, and 5, the tail section 19 has a substantially flat top 29, inwardly tapering side walls 30 (see FIG. 5), and a thin ridge 31 where the tapered walls 30 meet.

The end 26, 27 of tail section 19 preferably includes a socket 33, and because of the soft flexible nature of the tail section 19 the rattle 28 may be moved into or out of the socket 33, although it is held securely in place during normal fishing. The rattle 28 may be of the conventional type, such as having a hollow sphere 34 (see FIG. 3) of rigid material, such as hard transparent plastic, and at least one interior rattle element, such as a metal sphere 35. In the FIG. 1 embodiment the bulge 26 is generally in the form of a truncated cone, and takes up less than all of the end 21 of the tail section 19. In the FIGS. 2–4 embodiment the bulge 27 takes up substantially the entire end 21. The bulges 26, 27 may be spherical segments or have other bulge configurations aside from truncated cones.

The tail section 19 may be connected to the middle section 14 by any suitable means, such as shown in U.S. Pat. Nos. 1,707,407, 1,828,574, 2,691,235, 4,477,994, 4,044,492, 4,654,995, or 5,522,170. Preferably, however, it is connected by two (or more) removable pins 37, 37' (see FIGS. 1 and 5). The readily removable pins 37, 37' are of a hard material, such as steel or other metal, and extend into the channel 38 or other cavity formed in the rear 16 of the middle section 14, from different sides, as seen most clearly in FIG. 5, and are spaced along the length of the channel 38. This facilitates a simple tail section 19 replacement procedure.

Using the construction as illustrated and described, if the tail section 19 needs replacement, first the existing tail section 19 is merely ripped out. Since the pins 37, 37' are of much harder material the tail section 19 material simply tears. Then using a needle-nosed pliers, one reaches into the channel 38 and slides the pins 37, 37' outwardly to clear the channel 38. Each pin 37, 37' preferably is removed in a different direction, the pins 37, 37' preferably not extending through the entire side walls of section 14 on opposite sides of channel 38. Then a replacement tail section 19—either designed specifically for that purpose, or formed by cutting off the head and squaring (to obtain the desired overall fit and length) a conventional Kalin SWIM BAIT® lure—is slipped into the cavity 38, and one pushes the pins 37, 37' back into place. The rattle 28 may also be replaced as desired, replacement rattles 28 also being available from Kalin Farms.

The lure 10—particularly where the head section 11 simulates a fish—preferably includes recesses 39 (see FIGS. 1 and 2) in which eyes 40 are cut out, or painted, the recesses 39 being formed in the sides 41 of the head section 11. The head section 11 also comprises a top 42 and a bottom 43 (to which the connections 22 are preferably connected).

Figure 6:
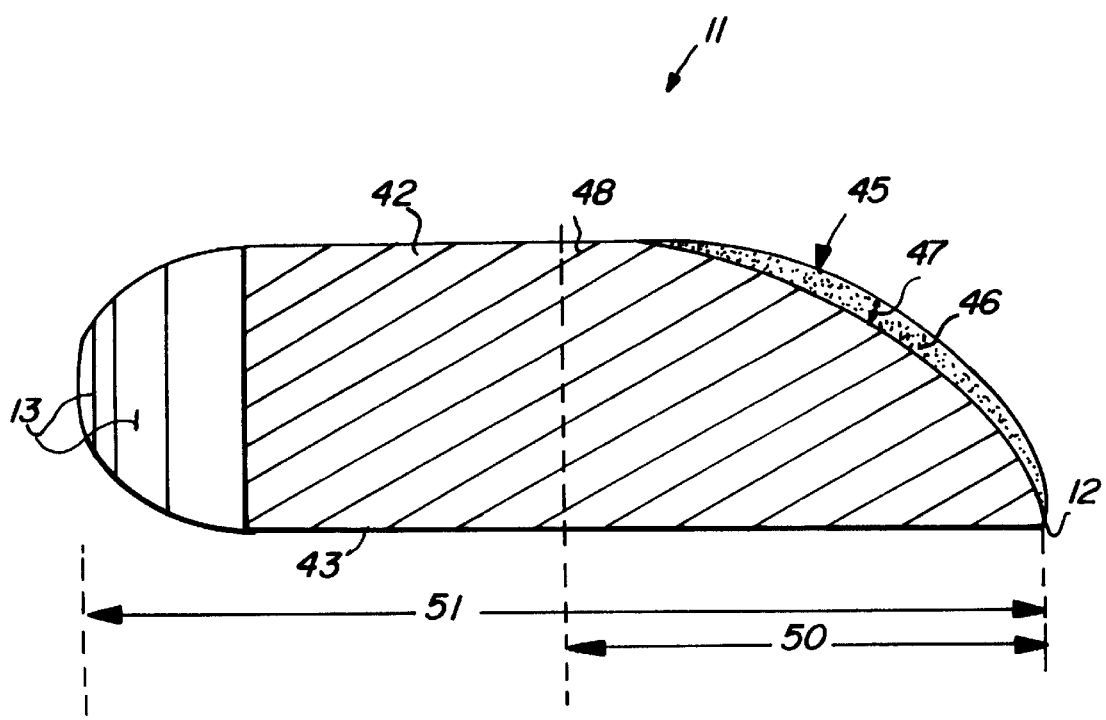
FIG. 6 is a side cross-sectional view bisecting the head section of the lure of FIGS. 1, 2, and 5 and with the pivot and fishing line connections removed.

In order to provide "high action" for the lure 10, a particular surface manifestation is formed in the front end 12 and top 42 of head section 11. The preferred form of this surface manifestation—as most clearly seen in FIGS. 1, 2, and 6—comprises a substantially continuous scoop shown generally by reference numeral 45, having curved and contoured surfaces, the scoop 45 dimensioned and positioned so as to cause erratic action of the head section 11 as the lure 10 is pulled through the water (e.g. by line 25). As seen in FIGS. 1 and 2, the scoop 45 preferably extends rearwardly from the front end 12 past the eyes 40, and includes two different angled portions, a portion 46 (see FIG. 6) which has a maximum depth 47, having a first relatively high angle with respect to the bottom 43 (e.g. between about 20–40° with respect to the bottom 43), and a top angled portion 48 at a significantly different angle (e.g. about 5 to 10° with respect to the bottom 43). While the actual dimensions of the scoop 45 will depend upon the length of the head section 11, and in fact of the whole lure 10, preferably the scoop 45 extends a length 50 (see FIG. 6), which is about 50% or more of the total length 51 of the head section 11. For example the length 50, where the length 51 is between about 4–4½ inches—may be between about 2¼–2½ inches, and the maximum depth 47 may be between about 3/16–5/16 of an inch (e.g. about ¼ of an inch). These proportions will be substantially maintained if the length 51 differs, and also perhaps depending upon the actual total length of the lure 10.

While the lure 10 specifically illustrated in the drawings is in a form simulating a small rainbow trout (and it may have the appropriate coloration, either painted on or inherent in the material for each of the sections 11, 14 and 19, for that purpose) it is to be understood that the lure 10 may have any suitable configuration of a fish or other aquatic animal, depending upon the particular game fish being sought when using the lure 10.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A fishing lure comprising:
   a substantially rigid head section having a bait simulating appearance, a front end and a rear end;
   a substantially rigid middle section having a front end and a rear end;
   a multi-dimensional pivot connection between said head section rear end and said middle section front end;
   a flexible material, integral injection molded piece of soft flexible plastic, tail section having a front end and a rear end, said front end of said tail section fixed to said rear end of said middle section;
   at least one hook receiving connection fixed to at least one of said head and middle sections;
   at least one attachment for connecting at least one of said head and middle sections to a fishing line;
   a three-dimensional bulge formed at said rear end of said tail section and defining a socket; and
   a rattle mounted by said bulge and received by said socket, said rattle making noise when said tail section is moved through water.

2. A fishing lure as recited in claim 1 wherein said head and middle sections each have a top and a bottom; and wherein said at least one hook-receiving connection includes a connection at said bottom of at least one of said head and middle sections; and further comprising a substantially continuous scoop formed in said head section at said front end thereof and in said top of said head section, for causing erratic action of said head section as said lure is pulled through the water.

3. A fishing lure as recited in claim 2 wherein said rattle comprises a substantially spherically shaped hollow hard element with at least one hard rattling element therein.

4. A fishing lure as recited in claim 1 wherein said rattle is removable from said socket without destroying said socket or rattle, and replaceable in said socket.

5. A fishing lure as recited in claim 2 wherein said head section simulates a fish, including eyes spaced from said front end, said scoop extending from said front end of said head section past said eyes.

6. A fishing lure as recited in claim 1 wherein said rattle comprises a substantially spherically shaped hollow hard element with at least one hard rattling element therein.

7. A fishing lure as recited in claim 1 wherein said tail section is readily removable, connected to said middle section by at least two readily removable hard pins extending from opposite sides of said middle section into an open channel in said rear of said middle section, and spaced along the length of said channel.

8. A fishing lure as recited in claim 2 wherein said fishing lure attachment comprises an attachment mounted to said head section front end, within said scoop.

9. A fishing lure as recited in claim 5 wherein said eyes include recesses formed in said head section, and wherein said scoop extends the length of said head section and includes two differently angled portions.

10. A fishing lure comprising:
    a substantially rigid head section having a bait simulating appearance, a front end and a rear end;
    a substantially rigid middle section having a front end and a rear end;
    a multi-dimensional pivot connection between said head section rear end and said middle section front end;
    a flexible material tail section having a front end and a rear end, said front end of said tail section fixed to said rear end of said middle section;
    at least one hook receiving connection fixed to at least one of said head and middle sections;
    at least one attachment for connecting at least one of said head and middle sections to a fishing line;
    said head and middle sections each have a top and a bottom; and wherein said at least one hook-receiving connection includes a connection at said bottom of at least one of said head and middle sections;
    a substantially continuous scoop formed in said head section at said front end thereof and in said top of said head section, said scoop dimensioned and configured to cause erratic action of said head section as said lure is pulled through the water;
    wherein said head section simulates a fish, including eyes spaced from said front end, said scoop extending from said front end of said head section past said eyes; and wherein said eyes include recesses formed in said head section, and wherein said scoop includes two differently angled, longitudinally spaced, portions.

11. A fishing lure as recited in claim 10 wherein said tail section is readily removable, connected to said middle section by at least two readily removable hard pins extending from opposite sides of said middle section into an open channel in said rear of said middle section, and spaced along the length of said channel.

12. A fishing lure as recited in claim 1 wherein said fishing lure attachment comprises an attachment mounted to said head section front end, within said scoop.

13. A fishing lure as recited in claim 10 wherein said scoop has a proportional length of between about 2¼–2½ inches, and a proportional maximum depth of between about 3/16–5/16 inch, when said head section is between about 4–4½ inches long.

14. A fishing lure comprising:
   a substantially rigid head section having a bait simulating appearance, a front end and a rear end;
   a substantially rigid middle section having a front end and a rear end;
   a multi-dimensional pivot connection between said head section rear end and said middle section front end;
   a flexible material tail section having a front end and a rear end, said front end of said tail section fixed to said rear end of said middle section;
   at least one hook receiving connection fixed to at least one of said head and middle sections;
   at least one attachment for connecting at least one of said head and middle sections to a fishing line;
   said head and middle sections each have a top and a bottom; and wherein said at least one hook-receiving connection includes a connection at said bottom of at least one of said head and middle sections;
   a substantially continuous scoop formed in said head section at said front end thereof and in said top of said head section, said scoop dimensioned and configured to cause erratic action of said head section as said lure is pulled through the water; and
   wherein said tail section is an integral injection molded piece of soft flexible plastic having an open-top socket for receipt of a rattle.

15. A method of using a fishing lure having head and middle substantially rigid sections connected together by a multi-dimensional pivot at a front end of the middle section, a channel in a rear end of the middle section, and a flexible tail section held in the channel by at least two hard material readily removable pins extending into the channel from opposite sides, and spaced from each other along the length of the channel, said method comprising the steps of:
   (a) ripping the flexible tail section out of the channel by pulling on the flexible tail section so that it is torn by the hard pins;
   (b) using a needle nose pliers or the like, engaging the readily removable pins and sliding them out of the channel, so that they extend outwardly from opposite sides of the lure;
   (c) placing a new flexible material tail section into the channel; and
   (d) pushing the pins back into the channel so that they penetrate the flexible material tail section and hold the tail section in place in the channel.

16. A method as recited in claim 15 comprising the further step of making the new flexible material tail section used in the practice of steps (c) and (d) by taking a pre-existing soft flexible material lure having a head and tail, and cutting off the head of the pre-existing soft flexible material lure and squaring the pre-existing lure off so that it fits properly in the channel.

17. A fishing lure comprising:
   a substantially rigid head section having a bait simulating appearance, a front end and a rear end;
   a substantially rigid middle section having a front end and a rear end;
   a multi-dimensional pivot connection between said head section rear end and said middle section front end;
   a flexible material tail section having a front end and a rear end, said front end of said tail section fixed to said rear end of said middle section;
   at least one hook receiving connection fixed to at least one of said head and middle sections;
   at least one attachment for connecting at least one of said head and middle sections to a fishing line;
   said head and middle sections each have a top and a bottom; and wherein said at least one hook-receiving connection includes a connection at said bottom of at least one of said head and middle sections;
   a substantially continuous scoop formed in said head section at said front end thereof and in said top of said head section, said scoop dimensioned and configured to cause erratic action of said head section as said lure is pulled through the water; and
   wherein said scoop includes a maximum depth portion at said front end of said head section and having an angle with respect to the bottom of between about 20–40°, and a lesser depth portion remote from said front end of said head section and having an angle of about 5–10° with respect to said bottom.

18. A fishing lure comprising:
   a substantially rigid head section having a bait simulating appearance, a front end and a rear end;
   a substantially rigid middle section having a front end and a rear end;
   a multi-dimensional pivot connection between said head section rear end and said middle section front end;
   a flexible material tail section having a front end and a rear end, said front end of said tail section fixed to said rear end of said middle section;
   at least one hook receiving connection fixed to at least one of said head and middle sections;
   at least one attachment for connecting at least one of said head and middle sections to a fishing line;
   said head and middle sections each have a top and a bottom; and wherein said at least one hook-receiving connection includes a connection at said bottom of at least one of said head and middle sections;
   a substantially continuous scoop formed in said head section at said front end thereof and in said top of said head section, said scoop dimensioned and configured to cause erratic action of said head section as said lure is pulled through the water;
   wherein said head section simulates a fish, including eyes spaced from said front end, said scoop extending from said front end of said head section past said eyes; and
   wherein said scoop has a proportional length of between about 2¼–2½ inches, and a proportional maximum depth of between about 3/16–5/16 inch, when said head section is between about 4–4½ inches long.

* * * * *